W. L. MORSE.
INCUBATOR EGG TRAY.
APPLICATION FILED SEPT. 3, 1918.
1,291,081.
Patented Jan. 14, 1919.
2 SHEETS—SHEET 1.
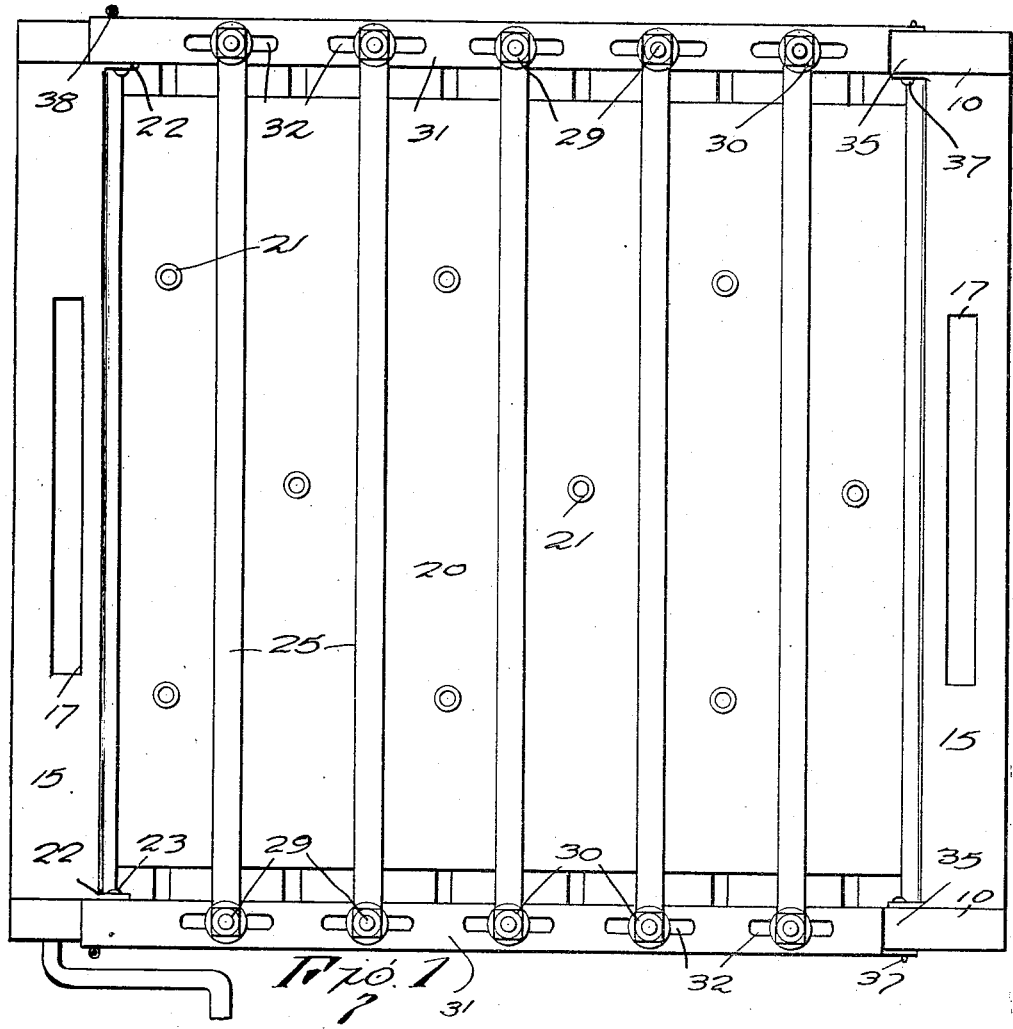
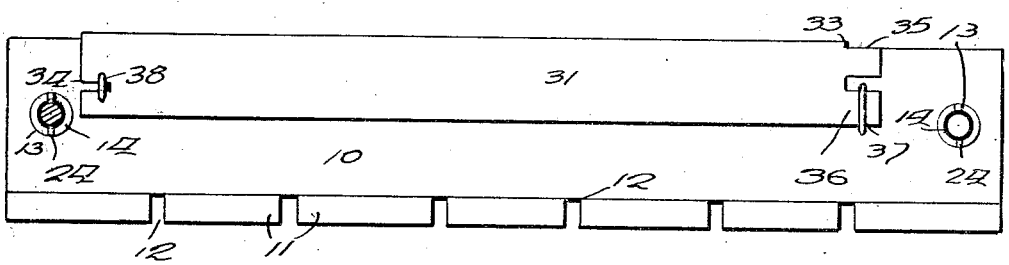
W. L. Morse
Inventor
By Geo. P. Kimmel
Attorney

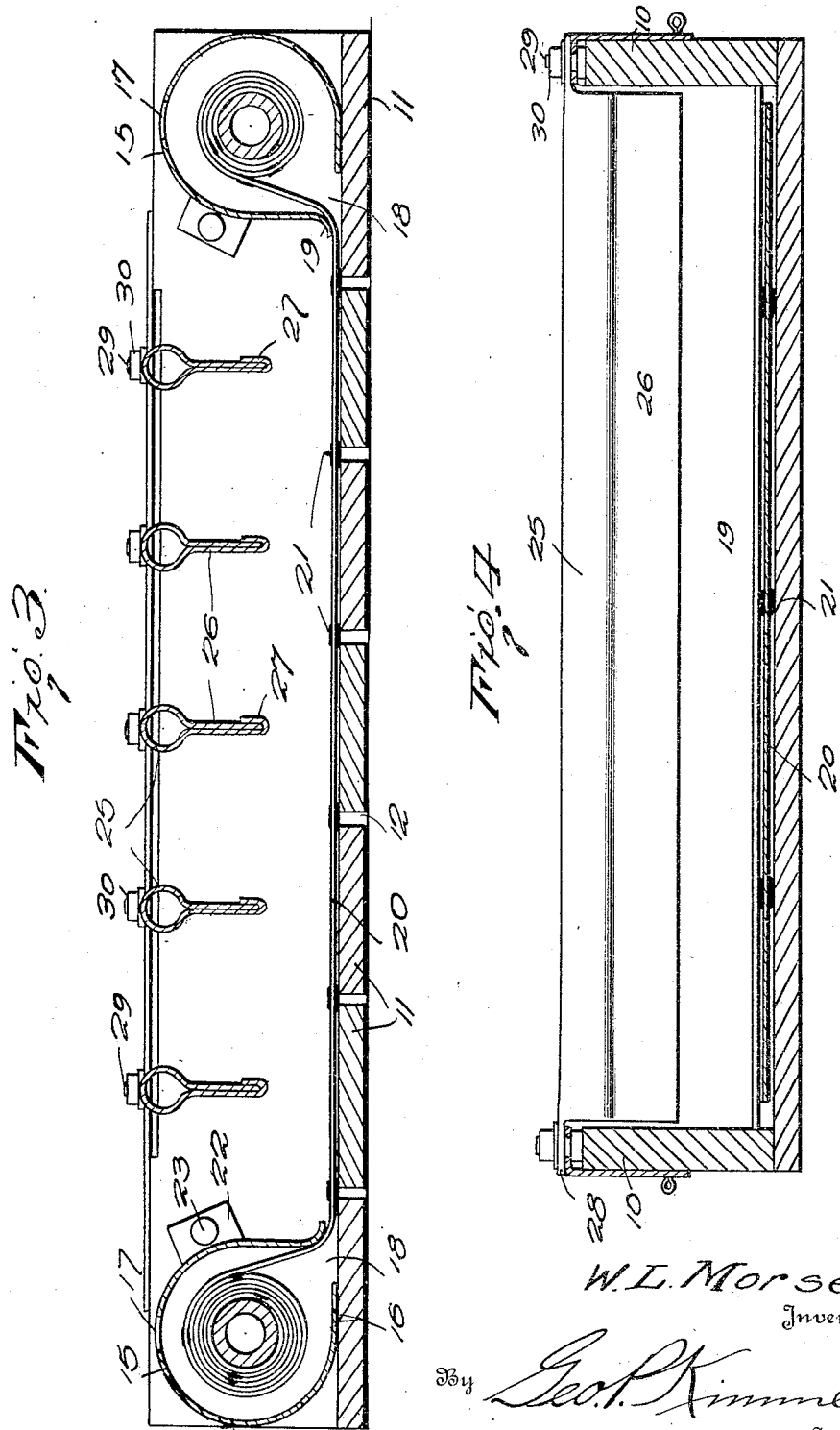

UNITED STATES PATENT OFFICE.

WILLISTON LOYD MORSE, OF PAWNEE CITY, NEBRASKA.

INCUBATOR EGG-TRAY.

1,291,081.  Specification of Letters Patent.  Patented Jan. 14, 1919.

Application filed September 3, 1918. Serial No. 252,368.

*To all whom it may concern:*

Be it known that I, WILLISTON LOYD MORSE, a citizen of the United States, residing at Pawnee City, in the county of Pawnee and State of Nebraska, have invented certain new and useful Improvements in Incubator Egg-Trays, of which the following is a specification.

This invention relates to an egg crate or tray for incubators, with associated means to cause turning of the eggs in the process of incubation, whereby the eggs will be kept at a uniform temperature and heated on all sides, so as to insure of a maximum hatch from a given quantity of eggs.

A further object of the invention is to provide an incubator egg crate or tray which can be adjusted to accommodate eggs of different sizes and which the day before hatching, will permit the removal of the cross rods of the tray as an entirety, so as not to interfere with the hatching operation, the device being also designed to allow proper ventilation.

With the above objects and others in view, as will appear as the description proceeds, the invention comprises the novel features of construction, combinations of elements and arrangement of parts which will be more fully described herein and set forth with particularity in the claims appended hereto.

Reference is had to the accompanying drawings forming a part of this application, wherein like reference characters will refer to similar views throughout the various parts, in which--

Figure 1 is a plan view of my improved incubator egg crate or tray,

Fig. 2 is a side elevation thereof,

Fig. 3 is an enlarged longitudinal sectional view, and

Fig. 4 is an enlarged transverse sectional view.

Referring to the drawings in detail, my improved incubator egg crate or tray comprises side portions 10 and a bottom consisting of a plurality of slats 11 disposed in spaced relation, to provide spaces 12 permitting ventilation through the crate or tray. The sides 10 adjacent to each end are provided with openings 13 receiving therein tubular shafts 14 having keyed ends projecting through said sides, to be engaged by a crank handle.

Inclosing the shafts 14 are casings 15, said casings being secured to the bottom portion as indicated at 16 and having a top opening 17 through which the interior is rendered visible. The casing at the front portion is provided with a slot 18 adjacent to an inwardly turned portion 19 and a canvas apron or strip 20 is designed to be wound upon the shafts or drums 14 at opposite ends of the crate or tray.

The strip or apron 20 is provided with a plurality of openings or eyelets 21 designed to allow ventilation in conjunction with the slots 12 for the eggs within the tray. The casings are provided with apertured lugs or ears 22 by means of which the casings are secured to the side portions 10 through suitable securing means indicated at 23.

Means is provided to hold the eggs in spaced relation and to hold them uniformly, while permitting them to turn when the apron or strip is moved in opposite directions through the medium of a suitable tool or handle engaged with the shafts 14 through the medium of the slots 24 thereof and for this purpose, a series of cross rods 25 are provided. These cross rods are preferably made of sections of sheet metal bent to provide tubular upper portions and having depending portions 26 with the edge of one overlapping the other as shown at 27, thereby accommodating the eggs therebetween as well as preventing the eggs from passing therebeneath. The ends of the cross bars project outwardly as shown at 28, the same being apertured to receive fastening bolts or the like 29 therethrough, with nuts 30 disposed uppermost. These bolts or detachable fastening means serve to connect the cross rods with side rails 31, the same consisting of right angular strips provided with a series of spaced longitudinal slots 32 receiving the fastening means or bolts 29 therethrough, so that the cross braces are all secured in spaced parallel relation to the side rails and capable of adjustment thereon to regulate the spaces between said cross braces. The side rails are placed upon the side portions 10, with the vertical portions of said side rails fitting outside of said side portions, the cross braces as well as the side rails being detachable. Thus, when hatching chickens' eggs, or eggs of similar size, all of the cross braces or rods are used, but when hatching turkey eggs, duck eggs, goose eggs or the like, every other of the cross braces or rods are removed. Furthermore, adjustment may be made of the fastening means in the slots 32, so as to permit the eggs to turn, without permitting them to jam, when the apron or strip is moved in one direction or the other, to turn the eggs during the incubation or hatching process.

In order to permit the entire removal of the cross braces or rods, together with the side rails thereof forming the spacing means or frame, said side rails are detachably connected to the side portions 10. For this purpose, the side portions of the side rails are provided with end slots 33 and 34, the ends provided with the slots 33 being cut away at the top, as shown at 35, while the lower portions 36 are engaged with eyelets 37 attached to the sides 10. Said sides are further provided to receive cotter pins or the like 38 through the slots 34, and by removing said pins, the side rails may be shifted longitudinally and pivoted upwardly to disengage the portions 36 from the eyelets 37. This is particularly desirable, as the cross rods or braces are removed the day before hatching when it is not necessary to agitate the eggs any longer.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus described my invention, what I claim as new, and desire to secure by Letters Patent, is:

1. An adjustable incubator egg crate comprising side portions and spaced bottom slats, casings at the ends of said side portions, drums rotatably mounted therein, an apron wound around said drums and extending along the top portion of said bottom slats, said casings having entrance slots adjacent to said bottom slats and serving as a connecting means for said sides, side rails detachably mounted upon said sides of the tray, and spaced parallel cross braces between said side rails, said side rails having longitudinal slots therein spaced apart and said side rails having depending portions and outwardly projecting portions, and fastening means detachably and adjustably connecting said outwardly projecting portions of said cross braces to said side rails through the medium of the slots therein.

2. An adjustable incubator egg tray comprising side portions and spaced bottom slats, casings at the ends of said side portions, drums rotatably mounted therein, an apron wound around said drums and extending along the top portions of said bottom slats, said casings having entrance slots adjacent to said bottom slats and serving as a connecting means for said sides, side rails detachably mounted upon said sides of the crate, spaced parallel cross braces between said side rails and adjustable connections between said cross braces and the side rails.

In testimony whereof, I affix my signature hereto.

WILLISTON LOYD MORSE.

Copies of this patent may be obtained for five cents each, by addressing the "Commissioner of Patents, Washington, D. C."